United States Patent [19]
Cruickshank et al.

[11] Patent Number: 4,733,047
[45] Date of Patent: Mar. 22, 1988

[54] SPOT WELDING TECHNIQUE

[75] Inventors: David G. Cruickshank, Pennington; Robert Webb, Ewing Township, Mercer County, both of N.J.

[73] Assignee: American Telephone and Telegraph Company, New York, N.Y.

[21] Appl. No.: 17,124

[22] Filed: Feb. 20, 1987

[51] Int. Cl.[4] .................................. B23K 26/00
[52] U.S. Cl. ..................... 219/121 LC; 219/121 LT; 219/121 LU
[58] Field of Search ............... 219/121 LT, 121 LS, 219/121 LE, 121 LD, 121 LU, 121 LV, 121 L, 121 LM

[56] References Cited
U.S. PATENT DOCUMENTS

| | | | |
|---|---|---|---|
| 4,088,865 | 5/1978 | Peters et al. | 219/121 LT X |
| 4,326,118 | 4/1982 | Smith | 219/121 LC |
| 4,487,477 | 12/1984 | Helms et al. | 350/172 |
| 4,531,054 | 7/1985 | Suzuki | 250/201 |

FOREIGN PATENT DOCUMENTS

| | | | |
|---|---|---|---|
| 0085687 | 5/1982 | Japan | 219/121 LT |
| 2154017 | 8/1985 | United Kingdom | 219/121 LM |

OTHER PUBLICATIONS

IBM Technical Disclosure Bulletin, vol. 20, No. 1, Jun. 1977, pp. 18-19.

*Primary Examiner*—C. L. Albritton
*Attorney, Agent, or Firm*—Robert B. Levy

[57] ABSTRACT

A beam (18) from a single laser source (16) is divided into a plurality of beams (24,30). Each beam (24,30) is directed into one end of a different lightguide fiber (36,38) having equal lengths so as to pass therethrough. The opposite ends of the fibers (36,38) are located proximate inner and outer sleeves (12 and 14) which are simultaneously spot welded at a plurality of sites by the beams exiting the fibers.

7 Claims, 1 Drawing Figure

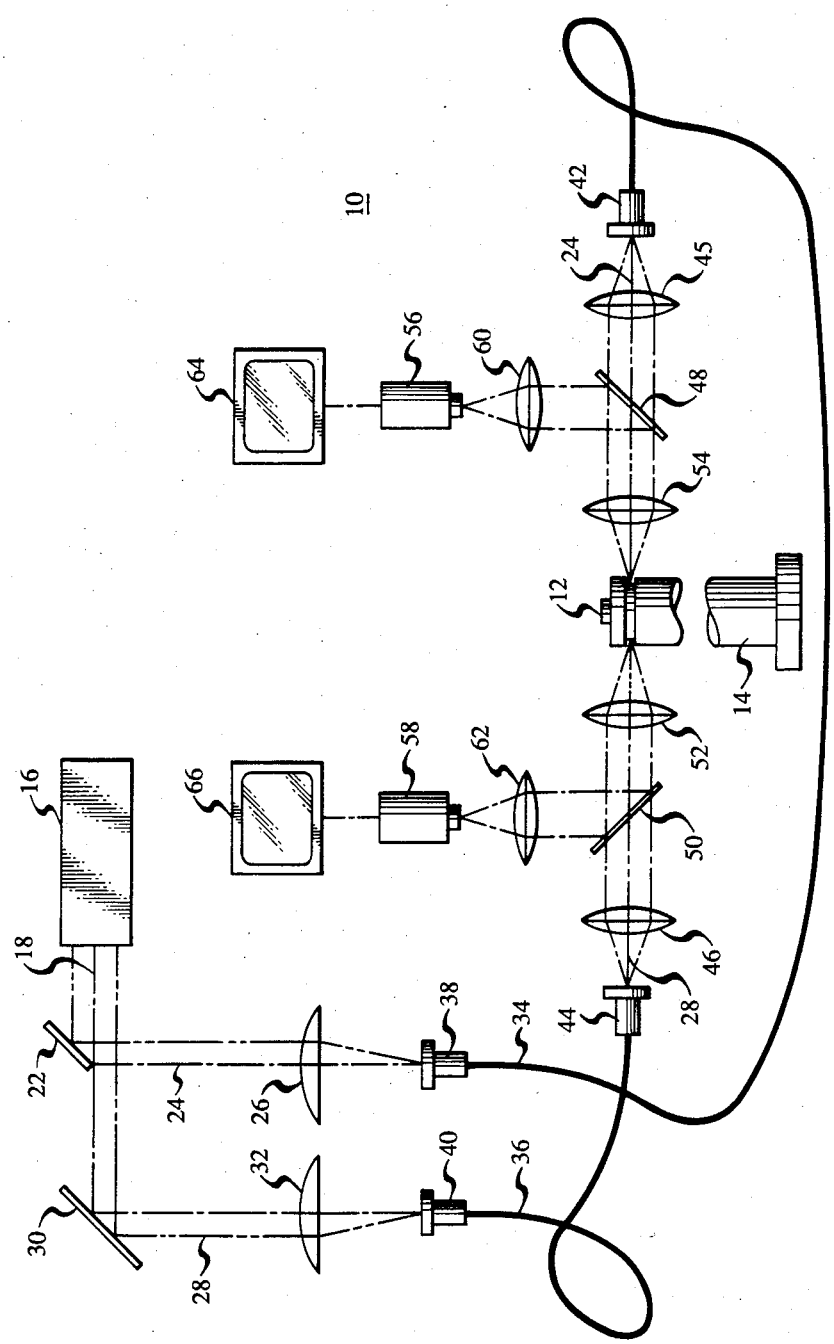

SPOT WELDING TECHNIQUE

TECHNICAL FIELD

The present invention is directed to a technique for simultaneously welding an article at a plurality of sites from a single laser source.

BACKGROUND OF THE INVENTION

Lasers have been used to spot weld one article to another. However, when articles such as coexpansive sleeves are to be spot welded to each other, problems can arise. When two sleeves are spot welded to each other a plurality of sites in a sequential manner, it is often difficult to maintain alignment between the sleeves to better than one micron, often a required accuracy. One possible reason for this is that sequential spot welding of the sleeves can result in thermal distortion thereof, causing relative movement between the sleeves.

A proposed solution to overcome the movement problem is to simultaneously spot weld the sleeves at two opposed sites using suitably directed beams emanating from both ends of a single laser. To avoid uneven heating of the sleeves, the beams must have substantially identical power and intensity profiles. To satisfy this criterion, additional costs are incurred for two sets of energy monitors, shutters, beam-expanding telescopics and fixtures. A pair of beams can also be derived from a single laser beam using conventional beam-splitting technology and equalizing techniques. Conventional equalizing techniques can result in an enery loss of up to forty percent, thus requiring a more powerful, and hence more expensive, laser to accomplish a given welding operation.

Accordingly, there is a need for a cost-effective welding system that provides two matching beams having substantially identical power and intensity profiles.

SUMMARY OF THE INVENTION

The present invention is directed to a technique for bonding two articles together by using a plurality of high-energy light beams derived from a single source beam without the use of conventional beam-equalizing techniques. The method comprises the steps of: generating a high-energy beam of light; splitting the beam into a plurality of beams; directing each split beam into a first end of a different optical waveguide (i.e., a lightguide fiber) so the beam passes therethrough; and positioning the opposite ends of the waveguides proximate the article to simultaneously bond the articles together at a plurality of locations with the beams passing through the waveguides.

BRIEF DESCRIPTION OF THE DRAWING

The single FIGURE is a schematic representation of the instant spot welding system.

DETAILED DESCRIPTION

The drawing depicts a system 10 for simultaneously spot welding inner and outer sleeves 12 and 14, respectively, each made from an iron-nickel alloy or the like, at two target sites thereon. The sleeves 12 and 14, once bonded together, form an article which may then be subjected to further processing steps, such as grinding or polishing the ends thereof. The welding system 10 comprises a laser 16 (e.g., Nd:YAG) which generates a coherent light beam 18 which is substantially split in half by a mirror 22 which reflects a first portion 24 of the beam 18 onto a first focusing lens 26. A second portion 28 of the beam 18 is reflected by a 45° mirror 30 onto a second focusing lens 32.

The first and second lens 26 and 32 couple the first and second portions 24 and 28 of the laser beam 18 into a first end of a first and second, equal-length, lightguide fibers 34 and 36, respectively. The first end of each of the fibers 34 and 36 is clamped in a separate one of ferrules 38 and 40, respectively. The first and second portions 24 and 28 of the laser beam 18 pass through the fibers 34 and 36, respectively, and exit from a second end of each fiber clamped in a separate one of ferrules 42 and 44. The first and second beam portions 24 and 28 exiting from the fibers 34 and 36 pass through lenses 45 and 46, first and second beam partially reflecting (two-way) mirrors 48 and 50, and focusing lenses 52 and 54, respectively. The focusing lenses 52 and 54 focus the beam portions 24 and 28 passing through the mirrors 48 and 50, respectively, onto opposed localized sites at the interface between the inner sleeve 12 and the outer sleeve 14. The beam portions 24 and 28, which are focused on opposed sites on the sleeves 12 and 14, cause substantially simultaneous formation of bonds thereat. The simultaneous formation of bonds at opposed sites on the sleeves 12 and 14 minimizes the thermally induced distortion thereof during the spot welding operation, thereby minimizing movement of the sleeves.

The welds are monitored by each of a pair of television cameras 56 and 58, which are positioned so that each sees the image of each of the bonding sites on the sleeves 12 and 14, as reflected thereto by a separate one of the mirrors 48 and 50 and focused by one of a pair of lenses 60 and 62, respectively. The outputs of the television cameras 56 and 58 are connected to each of pair of television monitors 64 and 66, respectively. Based upon the image of the bond sites appearing on the monitors 64 and 66, various system parameters, such as, for example, the focus of the lenses 52 and 54, can be adjusted to improve the quality of the weld.

The beam portions 24 and 28 which enter the end of the fibers 34 and 36 clamped in ferrules 38 and 40, respectively, are coherent. In other words, each of the entering beam portions 24 and 28 is comprised of light waves of the same phase. However, the entering beam portions 24 and 28 tend to have complementary, rather than identical, intensity profiles, so the power thereof is generally not equal. Upon the passage of the beam portions 24 and 28 through the lightguide fibers 34 and 36, the coherence of each of the beam portions 24 and 28 is reduced. It is believed that as the beam portions 24 and 28 pass through the fibers 36 and 38, the individual light waves comprising each beam portion tend to be internally reflected within the fibers at different intervals along the length thereof and at different angular intervals as well.

The combined effect of the reflection of each of the beams comprising the beam portions 24 and 28 at different lengths and at different angular intervals along each of the fibers 34 and 36, respectively, causes the individual beams to become substantially indistinguishable from each other. As a result, the intensity profiles of the beam portions 24 and 28 become substantially identical. When the intensity profiles of the beam portions 24 and 28 become substantially identical, then the power of the beam portions becomes substantially identical. Thus, by positioning the mirror 22 to divert one half of the beam 18 through the lens 26 and into the lightguide fiber 36, and the remaining half onto the mirror 30 so as to be reflected therefrom into the lens 28 and the fiber 36, the resulting intensity profiles and power of the beam portions 24 and 28 become substantially identical. Therefore, advantageously, the simultaneous welds formed by such beams will have substantially the same quality and strength.

It is to be understood that the embodiments described herein are merely illustrative of the principles of the invention. Various modifications may be made thereto by persons skilled in the art which may embody the principles of the invention and fall within the spirit and scope thereof. For instance, the exemplary embodiment divides the beam 18 into two beam portions 24 and 28. It is fully within the scope of the instant invention to divide the beam 18 into more than two beams. Furthermore, the exemplary embodiment describes spot welding of inner and outer sleeves at a plurality of sites. However, the instant technique can be used to spot weld articles having other geometries where the relative movement of the articles is to be minimized. Additionally, while the present invention contemplates the use of lightguide fibers, other types of optical waveguides, such as a hollow tube type, may be substituted therefor.

What is claimed is:

1. A method of fabricating an article comprising the steps of:
    bonding a first body to a second body by irradiating the bodies with a plurality of laser beams derived from a single laser source; and
    completing the fabrication of said article, characterized in that said bonding step comprises the steps of:
    generating a beam of laser light;
    splitting the beam into a plurality of independent beams;
    directing each independent beam into a first end of a separate one of a plurality of lightguide fibers so a portion of each independent beam passes therethrough; and
    positioning the opposite end of each fiber proximate the bodies to simultaneously bond the bodies together at a plurality of spaced sites with the independent beams passing through the fibers.

2. The method as set forth in claim 1, characterized in that the bodies are simultaneously bonded to each other at opposed locations.

3. The method as set forth in claim 1, characterized in that the beam is split by:
    directing the beam of light toward a mirror to divide said source beam into two identical beams of equal power.

4. The method as set forth in claim 1, characterized in that the first and second bodies are inner and outer sleeves, respectively.

5. An apparatus for bonding a first article to a second article, the apparatus comprising:
    means for generating a coherent beam of laser light;
    means for splitting the beam to form a plurality of independent beams, characterized in that said apparatus further comprises:
    means for directing each independent beam into one end of a separate one of a plurality of lightguide fibers so at least a portion of each beam passes therethrough; and
    means for positioning the opposite ends of the fibers proximate the article to simultaneously bond the articles together at a plurality of opposed sites with the beams passing through the fibers.

6. The apparatus as set forth in claim 5, characterized in that the articles are bonded to each other at opposed locations thereon.

7. The apparatus as set forth in claim 5, characterized in that the first and second articles are inner and outer sleeves, respectively.

* * * * *